March 27, 1945. E. G. FASSEL 2,372,192
DOCUMENT READING MICROSCOPE
Filed May 20, 1942 3 Sheets-Sheet 1

INVENTOR
ELGIN G. FASSEL
BY Wheeler, Wheeler & Wheeler
ATTORNEYS.

March 27, 1945.    E. G. FASSEL    2,372,192
DOCUMENT READING MICROSCOPE
Filed May 20, 1942    3 Sheets-Sheet 3

INVENTOR
ELGIN G. FASSEL
BY
Wheeler, Wheeler & Wheeler
ATTORNEYS.

Patented Mar. 27, 1945

2,372,192

UNITED STATES PATENT OFFICE 2,372,192

DOCUMENT READING MICROSCOPE

Elgin G. Fassel, Milwaukee, Wis.

Application May 20, 1942, Serial No. 443,735

2 Claims. (Cl. 88—39)

My invention relates to improvements in document reading microscopes, with particular reference to the re-examination of miniature photographic reproductions of documents after the originals have been lost or destroyed.

In my Patent No. 2,177,135, dated October 24, 1939, I have disclosed means for obtaining, upon sensitized strips or films, miniature paired photographs of both sides of each document in groups which have been selected for examination or destruction, whereby such photograph carrying strips or films may be spirally wound and stored. Millions of such pictures may be stored in a small cabinet, either temporarily or permanently.

Documents of various kinds often have written or printed matter on both sides, and in some cases inverted or extended across the ends at right angles to other notations, and some rotations may also appear in oblique positions.

It is desirable that the document, or any record thereof, be held in a fixed position when examined under a microscope, and the primary object of my invention is to provide means to facilitate the microscopic examination of documents or miniature records thereof, including records which have been serially mounted upon a carrier strip, by shifting the images of such documents, while the latter are in a stationary position.

More particularly, it is my object to provide an ordinary microscope with means for rotatively adjusting images and presenting to the eye, or eyes of the observer, upright images of each feature of the object to be examined, regardless of its relative position with reference to the other features of the photograph or other object, whereby the image of each feature may be separately studied in its most favorable position while the object itself and the entire carrier, or film, remains in a fixed position.

Another object is to provide means for advancing and retracting the carrier strips or films to permit repeated examination and comparison of the various documents in a series.

A further object is to provide means for centering carrier strips of differing widths for observation through a microscope and advancing or retracting such carrier strips, whereby multiple series of photographs or other objects on carrier strips of differing widths may be successively examined microscopically and compared with each other.

In the drawings.

Like parts are identified by the same reference characters throughout the several views.

Figure 1:
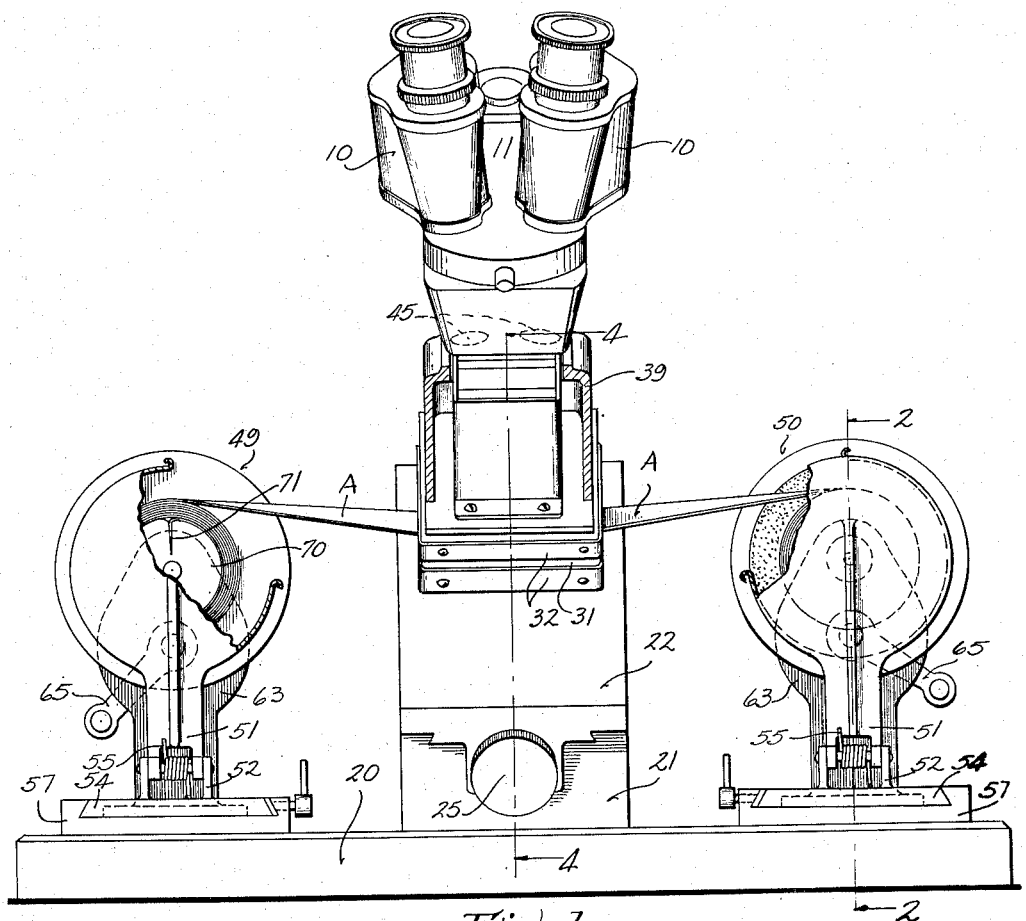
Figure 1 is a front elevation of a binocular microscope of the duplex type commercially known as the "Greenough" type, and showing my invention combined therewith in association with suitable strip feeding means, whereby a carrier strip containing photographs or objects to be examined may be advanced and retracted across the line of sight underneath the object glass of the microscope.

Binocular microscopes are vertically adjustable with reference to the object to be viewed, and in ordinary low power binocular microscopes there is approximately a three inch space between the object glass and the mounting for the object. In the construction illustrated in Figures 1, 2, 3 and 4, the barrel or body 10 of the microscope is supported by a bracket 11 from a slide 12 mounted for vertical adjustment along a post 13 connected with the mounting member 14. When the focal range has been determined, the slide is locked to the post by means of a set screw indicated at 15 in Figure 4.

To facilitate inspection of the photographs by an observer seated on a chair or stool, a microscope of any suitable type may be preferably supported in an inclined position, such as that occupied by the binocular microscope illustrated in Figure 1. In the construction illustrated, the microscope is supported from a table top 20 by a frame 21 having an inclined upper margin provided with an adjustable centering slide 22, apertured at 23 and movable along a suitable slideway on the inclined upper margin of the frame 21 by means of an adjusting screw 25. A dependent housing 28 supports a lamp 29, preferably provided with a parabolic reflector and located underneath the aperture 23, and above the apertured portion of the slide 22 I provide a correspondingly apertured mounting plate 30 which at one end supports the mounting member 14 and at the other end supports a glass plate 31, anchored to the plate 30 on three sides by clips 32 and over which the photograph carrier or film A may pass. A superposed glass plate 33 is secured to the mounting member 14 by metal anchoring clips 32. The two glass plates 31 and 33 are spaced from each other in a recess formed in the mounting member 14 and provide a transparent feedway, which is open at the front and sides to allow the film A to be manipulated transversely into the feedway as hereinafter explained. Light may pass from the lamp 29 through the aperture 23, aperture 34 in mounting plate 30, and through the glass plates, thus illuminating the film A from the under side.

The portion of the mounting member 14 which overhangs the transparent feedway is correspondingly apertured and the margin of its aperture is undercut to receive an annulus 37, secured by suitable screws 38 to a depending cylindrical portion of a rotatable housing 39 within which image reversing mirrors 40, 41 and 42 are supported.

Rays of light from the lamp may thus pass through the film to the obliquely inclined mirror 40, to be reflected thereby to the vertical mirror 41, back in reversed position to the oppositely inclined mirror 42, and thence to the object glass 45 of the microscope to render visible through the microscope an inverted image of the object carried by the film. The microscope will of course be adjusted on the post 13 to shorten the actual distance between the object glass 45 and the film A, in correspondence with the increased length of the light ray paths, thus keeping the object glass within proper focal range from the film. The inclined mirrors are preferably placed, each at an angle of 30 degrees from the plane of the vertical mirror.

The transparent walls of the feedway formed by the glass plates 31 and 33, and the registering apertures in the slide 22 and the mounting members 30 and 13, are of sufficient dimensions to expose films of maximum width to the microscope. When shifting from a film of a certain width to one of different width, the slide 22 will be adjusted to bring the center of the object glass to a line perpendicular to the center line of the film.

The carrier strips A are customarily stored in the form of spirally wound coreless rolls. To facilitate inspection of such strips or films, I provide holders 49 and 50, on opposite sides of the microscope, whereby the roll to be inspected may be mounted in one of the holders and fed through the transparent feedway of the microscope to the other holder, within which it may be rewound.

Figure 2:
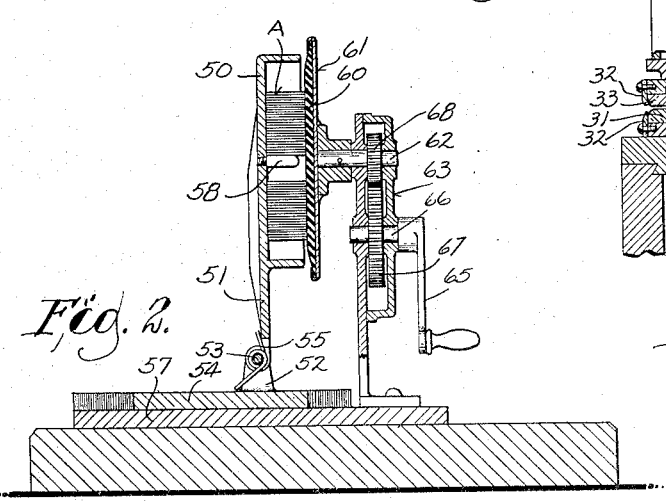
Figure 2 is a sectional view of one of the roll supporting devices for the carrier strip, drawn to line 2—2 of Figure 1.
Figure 3:
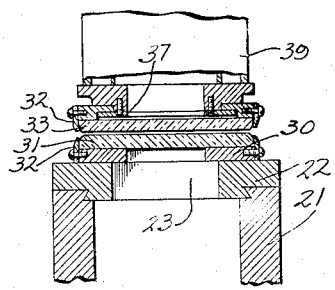
Figure 3 is a detail sectional view of the carrier feedway, drawn to a plane intersecting the axis of the carrier strip.

Each holder 49, 50, is preferably of a generally cup-shaped form, as best shown in Figure 2, the upright portion being hereinafter referred to as the bottom, and the peripheral portion being referred to as the side wall. The side walls of the respective holders are cut away to provide openings through which the carrier strip may pass. Each holder has an arm 51 pivotally connected with a bracket 52 by a pivot pin 53. The bracket 52 is carried by a slide 54 adjustably mounted in a slideway on a base plate 57. A length of resilient wire 55 is coiled about the pivot pin 53, with one end bearing on the slide and the other against the arm 51, the arrangement being such that the arm 51 is urged toward the upright position in which it is illustrated in Figure 2.

The bottom wall of the roll outfeeding holder 50 may be centrally provided with a pin 58 to loosely receiver and support the roll of film or carrying strip A, with one margin of the strip bearing against the bottom wall of the holder and the other margin bearing against a friction pad 60 carried by a rotatable disk 61.

The disk 61 is mounted on a shaft 62 which has bearings in a gear housing 63. The shaft 62 may be manually rotated in either direction by a crank 65, crank shaft 66, gear wheel 67, and the pinion 68 on shaft 62. The holder 49 has a core 70 provided with a kerf 71 in which the end of the film may be inserted, whereby when the disk 61 is rotated, the carrier strip may be drawn from the holder 50 and wound upon the core 70.

The holders 49 and 50 may each be swung downwardly on the pivot pin 53 to facilitate the insertion or removal of carrier rolls A. The side walls of the holders are cut away, as shown in Figure 1, to allow the end of the carrier strip to be extended through the feedway of the microscope to the receiving core 70. The intermediate portion of the carrier strip may be manipulated between the glass plates 31 and 32, and the holders properly positioned with reference to the width of the film by adjusting their supporting slides 54.

Microscopes of the binocular mon-objective type ordinarily have their prism housing 80 fixed to a vertically adjustable slide 81, which may be secured to the housing by set screws having operating handles 82. Also, in the construction illustrated, the slide 81 is vertically adjustable on an upwardly projecting arm 83 of a horizontally adjustable slide 84, movable along a fixed support 85. After adjustment, these parts are secured by thumb screws 86 and 87.

All of the parts, 80 to 87 inclusive, as well as the unlettered parts of the microscope and the prism system enclosed within the housing 80, may be assumed to be of ordinary construction. Therefore detailed illustration and description are deemed unnecessary.

For the purposes of my invention, I provide the slide 81 with a bracket 90 which carries a ring 91. This ring supports a hanger sleeve 92, having a flange 93 bearing upon the top of the ring, to which it is clamped by a collar 94 threaded to the lower end of the sleeve and provided with a depending threaded portion 95 which is screwed to the upper end of a housing 96 containing image reversing mirrors 40a, 41a and 42a. The housing 96 has bottom and top apertures in the line of sight.

Figure 4:
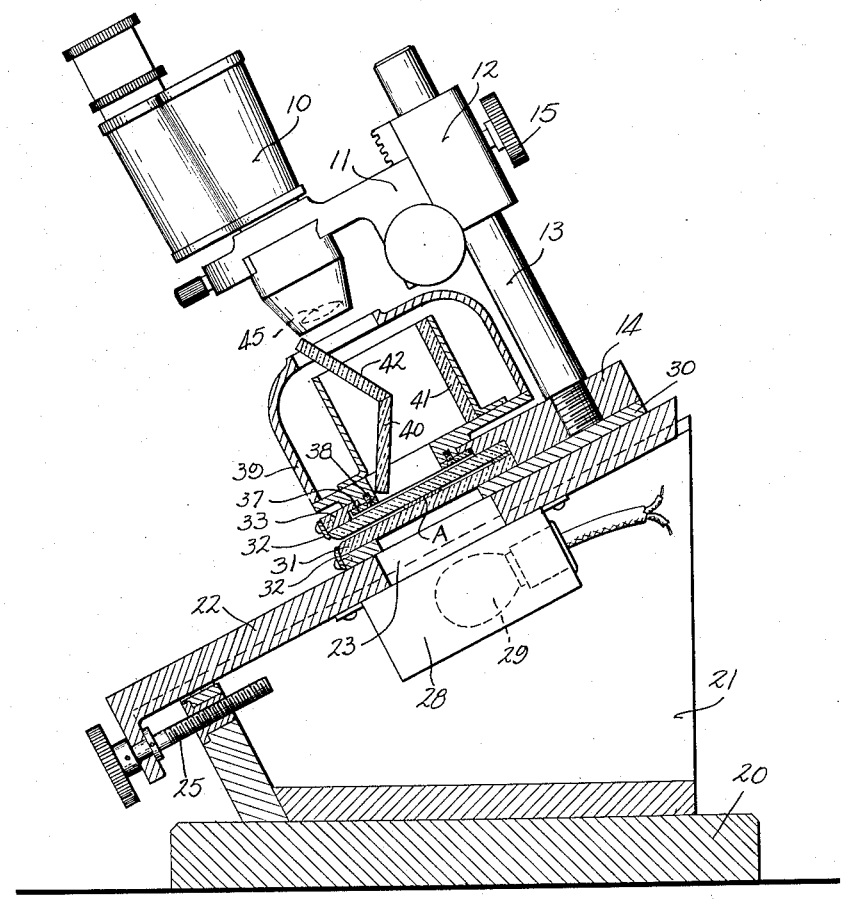
Figure 4 is a side elevation, partly in vertical section, drawn to line 4—4 of Figure 1.
Figure 5:
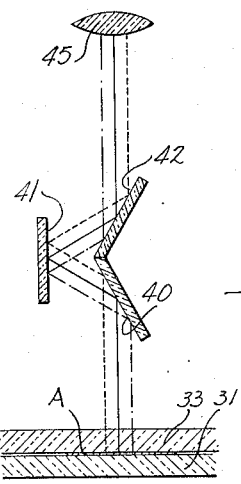
Figure 5 is a diagrammatic view, showing, in vertical section, the carrier strip, a set of image shifting mirrors and the objective lens of the microscope, and indicating the paths taken by the rays of light in passing from the film to said object glass.
Figure 6:
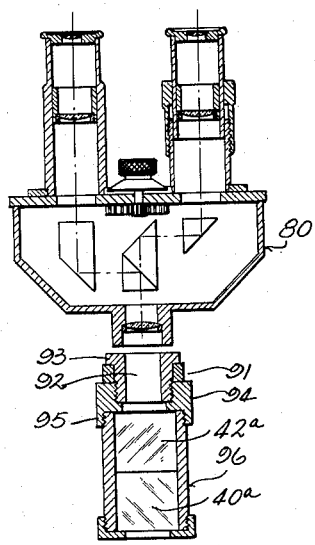
Figure 6 is a front elevation, partly in vertical section, of a microscope of the "mon-objective," binocular type to which my invention has been applied.
Figure 7:
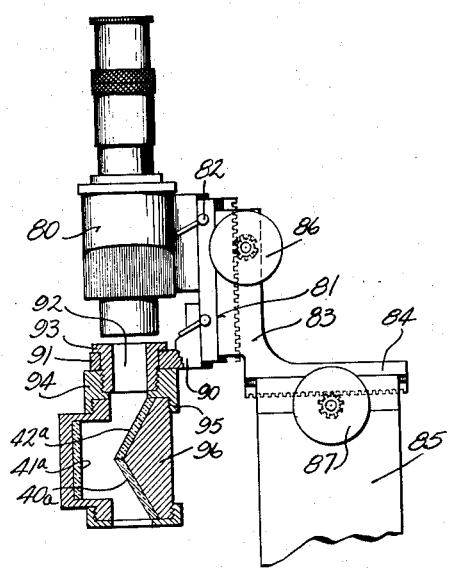
Figure 7 is a side elevation of the microscope shown in Figure 5, also showing the image shifting attachment in vertical section.

It will be understood that the fixed support 85 may, if desired, be connected with a slide such as the slide 22 shown in Figure 4. In any event, it may be associated with carrier holders, a transparent feedway, a suitable mounting, and illuminating means similar to the corresponding parts shown in Figures 1 to 5, inclusive. It will also be understood that, if desired, the supporting means shown in Figure 4 may be substituted for that shown in Figures 6 and 7.

In microscopes of the mon-objective type there is but one object glass, and the mirrors of the optical image adjusting system may be correspondingly reduced in size.

Figure 8:
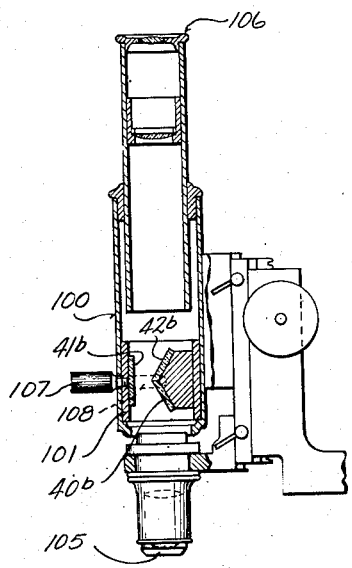
Figure 8 is a side elevation, partly in section, showing an embodiment of my invention in an ordinary monocular microscope.

In Figure 8 I have illustrated an ordinary monocular microscope having its barrel 100 extended and provided with a built-in housing sleeve 101 containing image reversing mirrors 40b, 41b and 42b. The sleeve 101 and its associated mirrors are interposed between the object glass 105 and the eye piece 106, and the mechanical tube length is reduced to maintain the established optical tube length. The sleeve 101 may be oscillated by a handle 107 which extends through an arcuate slot 108 in the barrel 100.

Figure 9:
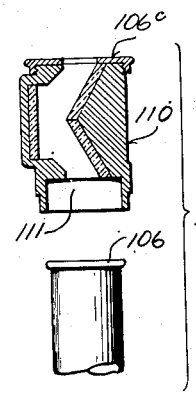
Figure 9 shows a vertical section of the image shifting device in a modified form, adapted to be applied to the eye piece of an ordinary monocular microscope, a fragment of such eye piece being illustrated in full.

In the modification shown in Figure 9, a mirror enclosing housing 110 of a generally cylindrical form, has an eye piece 106c at its upper end, and is socketed at 111 to fit the eye piece 106 of a microscope such as is shown in Figure 8. Similar image shifting effects are obtained by rotating the housing 110.

In each structure illustrated in the drawings, a 45 degree rotation or oscillation of the mirror carrying housing will effect a 90 degree shift in the position of the image, and a 90 degree oscillation will effect a 180 degree shift or a complete inversion of the position of the image. Rotation through intermediate angles will effect a corresponding apparent shift of position of the image with respect to the actual position of the object. Therefore, matter written or printed across the end of a document may be made to appear to the eye in an upright position by a 45 degree oscillation of the housing, and inverted matter on the document may be made to appear to the eye in an upright position by a 90 degree oscillation of the housing.

No matter what the angle at which a notation appears to the object, its image may be presented in any desired position for study. I preferably employ "first surfaced" mirrors, in which reflection occurs directly from the first surface encountered by the light, without penetration, the aluminized type being durable and very satisfactory. As is well known in the art, suitable prisms may be substituted for the mirrors, although mirrors of the above mentioned type, with the oblique mirrors each set at an angle of 30 degrees from a vertical plane, are preferred. It is obviously immaterial whether the feedway walls are transparent, or otherwise adapted to expose objects to view through the microscope under proper conditions of illumination.

I claim:

1. In a microscope for reading strips carrying miniature photographs, a base, a rigid upright standard carried by said base, a microscope adjustably carried on said standard, an opening formed in said base in alignment with the axis of the objective of said microscope, a guideway for said strips formed in said base beneath said opening and crossing said axis, said guideway including transparent plates between which said strips may pass, a second opening formed in said base beneath said first opening and said guideway, illuminating means beneath said second opening, a casing between said microscope and said base and having its lower end swiveled on said base and adapted to be manually rotated on said base, aligned openings formed in the top and bottom of said casing concentric with said axis, and a set of reflecting surfaces mounted in and movable with said casing, said set comprising a pair of oppositely inclined surfaces angularly disposed equally with respect to and cut by said axis, and a surface spaced apart from and parallel to said axis and adapted to transfer images of said photograph from one surface of said pair to the other, whereby an operator may rotate said casing on its swivel to rotate the image of the photograph being viewed about said axis.

2. In a microscope for reading strips carrying miniature photographs, a base, a rigid upright standard carried by said base, a microscope adjustably carried on said standard, an opening formed in said base in alignment with the axis of the objective of said microscope, a guideway for said strips formed in said base beneath said opening and crossing said axis, said guideway including transparent plates between which said strips may pass, a second opening formed in said base beneath said first opening and said guideway, illuminating means beneath said second opening, a casing between said microscope and said base and having its lower end swiveled on and adapted to be manually rotated on said base, aligned openings formed in the top and bottom of said casing concentric with said axis, and a set of first surface mirrors mounted in and movable with said casing, said set comprising a pair of oppositely inclined mirrors angularly disposed with respect to and cut by said axis, and a third mirror spaced apart from said pair of mirrors and parallel to said axis for transferring images from one mirror of said pair to the other, whereby an operator may manually rotate said casing on its swivel to rotate the image of a photograph being viewed about said axis.

ELGIN G. FASSEL.